April 5, 1966   C. J. ARMSTRONG ETAL   3,244,888
LIGHT RESPONSIVE OFF-PEAK UTILITY SWITCH
Filed Dec. 19, 1961   2 Sheets-Sheet 1
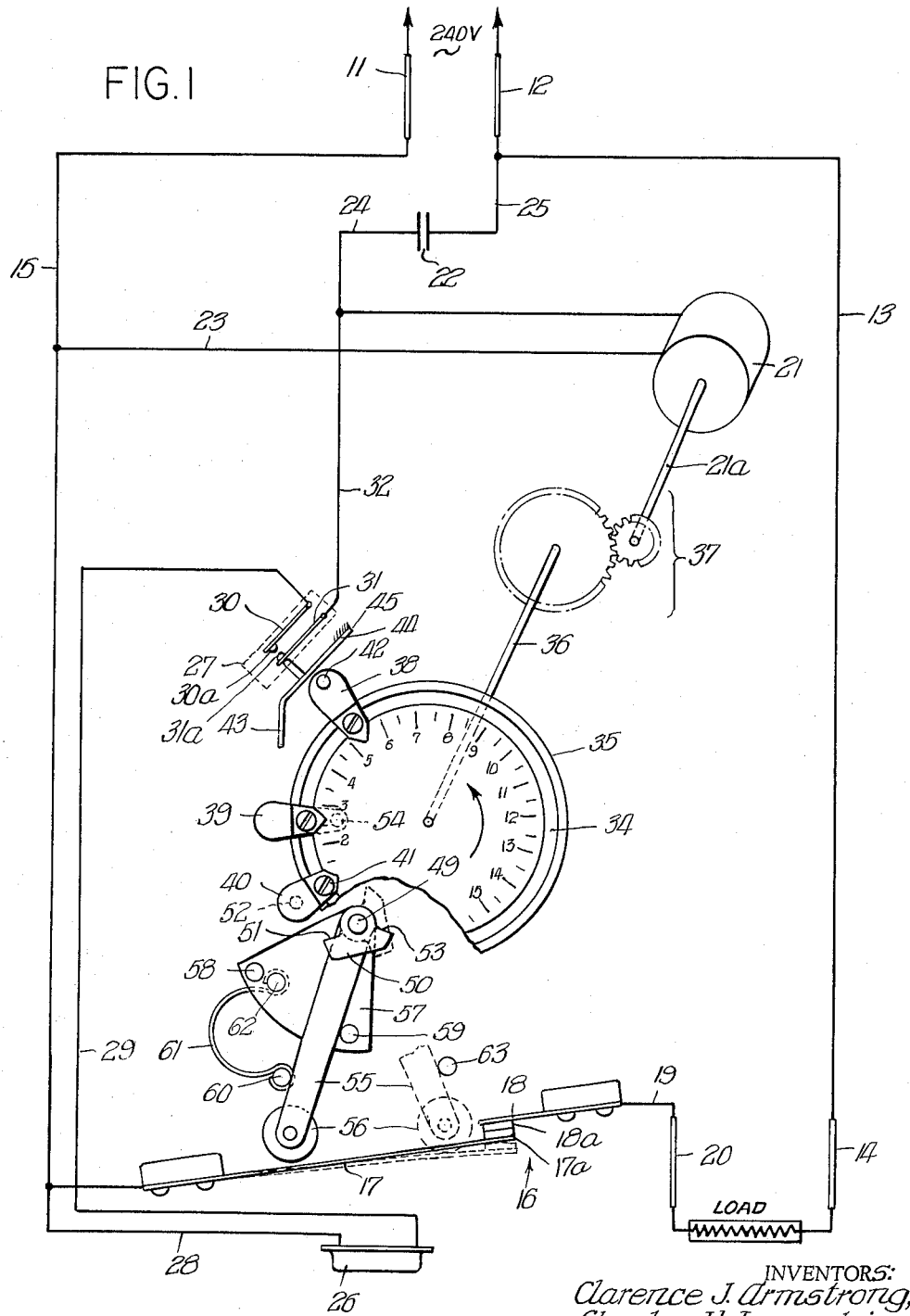
INVENTORS:
Clarence J. Armstrong,
Charles H. Lanphier,
By Brown, Jackson, Boettcher & Dienner
Attys

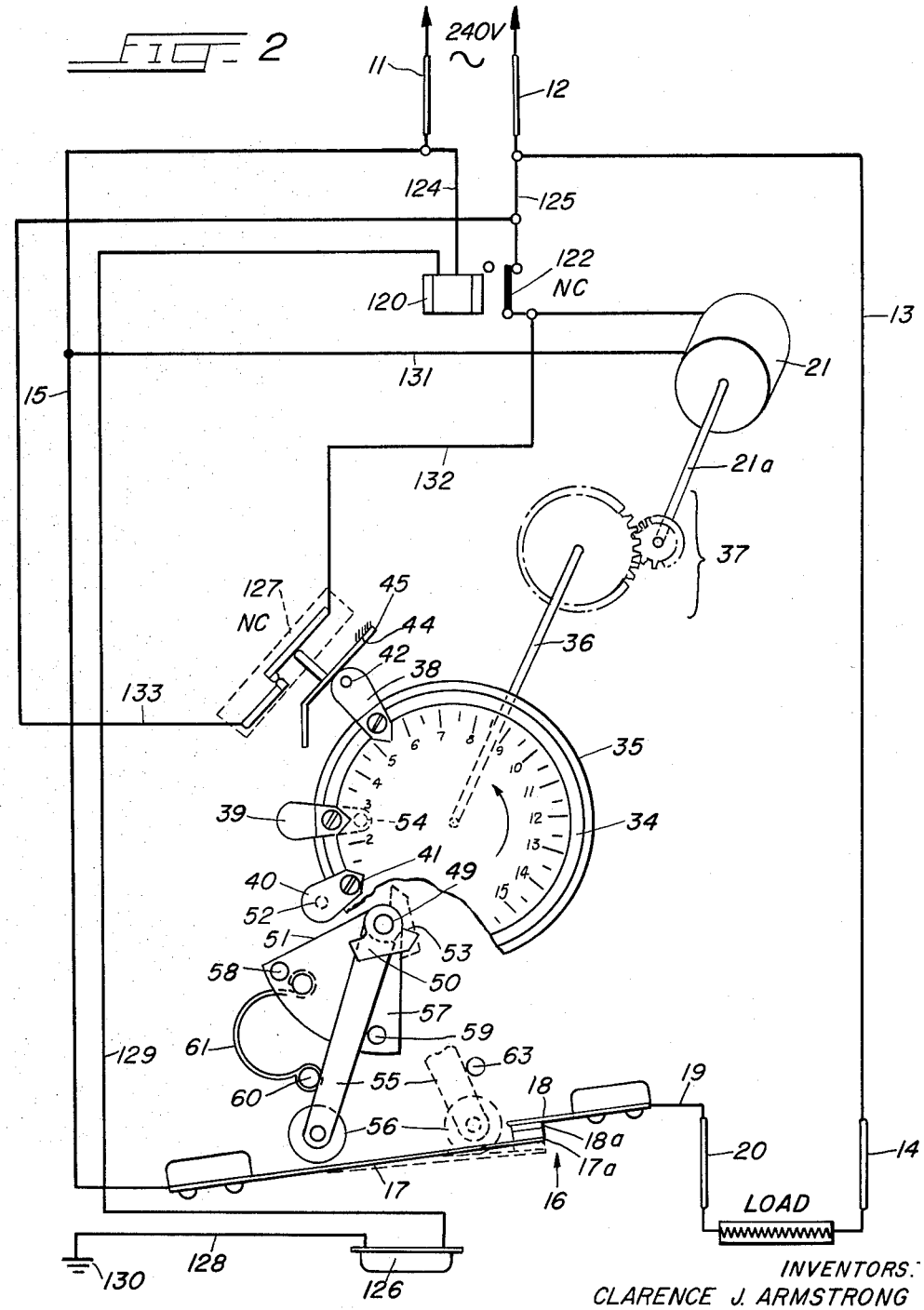

3,244,888
LIGHT RESPONSIVE OFF-PEAK UTILITY
SWITCH
Clarence J. Armstrong and Charles H. Lanphier, Springfield, Ill., assignors to Sangamo Electric Company, Springfield, Ill., a corporation of Illinois
Filed Dec. 19, 1961, Ser. No. 160,529
10 Claims. (Cl. 250—206)

This invention relates to time switches and more particularly to a photo-controlled time switch which is darkness actuated.

A principal object of the invention is to provide a darkness actuated time switch which will automatically control the switching on and off of a load circuit so that the load will be energized and/or de-energized during pre-established time intervals related to the onset of darkness each day.

Another important object of the invention is to provide a darkness actuated time switch which will automatically disconnect an electric power load during peak load periods.

In the evening of a few days of each year the electric power companies experience a demand for electric power which for said short interval considerably exceeds the normal daily power demand. This excessive demand is referred to as "peak load." Because the peak load period is brief it has not been considered economically feasible to make the heavy and costly investment in plant facilities that would be necessary to meet this demand. However, a satisfactory solution to the problem of peak load has long been of serious concern to the electric power supply companies.

Experience has shown that the peak loads occur daily at a time related to the occurrence of darkness. They are most pronounced during the winter months as in November, December and January. However, both the starting time for a peak and the duration of the load peak will vary from day to day. Despite these variances, experience has indicated that these periods commence immediately after the onset of darkness and within the first two and one half hours thereafter.

In order to even out the load on the electric power system without increasing the peak loads beyond the limit of supply lines, transformers and generating equipment, it has been the practice of electric power companies to offer special rates in an effort to encourage customers to use electrical energy at off peak times for water heating and other special purposes. Customers who accept these rates are provided with means which are intended to disconnect their water heater during the peak load period.

Various methods of disconnecting the water heaters from the electric supply during the peak period have been explored by the electric power companies. Pilot wire controls were tried but found objectionable due to the extra wire involved. High frequency signalling has also been employed but abandoned as not practical.

The most popular method of disconnecting the special loads at peak time has been through the use of clock-operated switches, commonly referred to as time switches. Usually these are electrically driven by a small synchronous motor and are arranged to disconnect the off-peak load for a pre-selected period of each day. The simpler type of time switches disconnect and reconnect the load at a fixed time each day. However the time of the load peak changes from day to day with the seasonal variation in time of sunset. It is also subject to varying weather conditions, as for example, the early onset of darkness brought on through the presence of heavy dark rain clouds overhead. Consequently the "off" time of such switches must be long enough to assure disconnection during the period when the peak load actually occurs. This has necessitated disconnecting the water heaters for periods of 4, 5, 6 or even longer hours. Such long "off" periods are a source of considerable annoyance to the customer if much hot water is used during the period.

Due to local service outages, conventional time switches will not remain on time, further contributing to the problem. Moreover, unless the time switches are reset after one or more power outages occur, the setting of the time switch may be sufficiently upset that the peak load period will be missed. Time switches with spring-wound carry-over mechanisms are available but such devices are expensive and have mechanical clock-type escapements which are difficult to maintain. The result has been that where time switches have been employed in the past as off-peak utility switches, a regular program has had to be devised for regular manual resetting of the time dials as well as after power outages. In rural areas, this job is an item of appreciable expense.

Time switches have also been equipped with astronomic dials which automatically vary the time switch operation to take care of seasonal variation in time of sunset. These are, however, obviously more expensive than the simple time switch and make no allowance for cloudy weather conditions which may cause early darkness.

Thus a principal object of the present invention is to provide a control device which will disconnect the load from the power lines for a pre-set time interval related to the occurrence of darkness each day and hence to the time of the peak load.

A further specific object is to provide such a control device which will not be subject to the need of manual resetting after power outages and also will permit a minimum "off" period. Still another object of the present invention is to provide a control device which is inexpensive to manufacture, and also to maintain, as well as one which does not have to be manually set either at the time of installation or following power outages.

Still a further object is to provide a control device which permits a minimum "off" period and which will nevertheless assure that the load will be disconnected at the proper time each day to avoid a peak on the system.

Thus, in accordance with the invention an off-peak utility switch is provided which comprises a switch member connectable into the load circuit in combination with a rotatable switch operating member and an energizable motor drivingly connected to the switch operating member to turn it at a rate which will make one complete turn in less than 24 hours, yet is slow enough that it will take more hours than equals the maximum darkness period of any one day of the year. Initiation of the motor and therefore rotation of the switch operating member is obtained through a control circuit having a photo conductive cell arranged with means to initiate energizing of the motor when the cell is rendered non-conductive by darkness.

In one form of the invention the photo conductive cell is connected in parallel with the motor and both the cell and motor are series connected with a capacitor of selected impedance. In this embodiment when the photo cell is rendered conductive by daylight its impedance and resistance values will be so low that the voltage across the motor will be insufficient for the motor to operate. However, with darkness the resistance and impedance of the cell rises to a point where it is large relative to that of the motor and the voltage across the motor becomes sufficient to cause the motor to start.

The difference between the time which it takes to revolve the switch operating member and a full 24 hour day represents the total power outage per day which the control device can tolerate without such outages interfering with the function of the device on subsequent days. Twenty hours has been selected as an ideal rate for driving the switch operating member one revolution. If the time were shortened to where it would equal the longest period of darkness due to the season this would allow for a greater period of power outage. However, a cloudy condition at the beginning or end of the cycle could conceivably cause an immediate recycling and thus interfere with the schedule. The running time of 20 hours for one revolution provides an adequate safety factor for weather conditions from 60° N. latitude to 60° S. latitude where the maximum time between sunset and sunrise is in the order of 18 hours.

Unless some compensating means are provided, with the coming of daylight, the photo conductive cell in the control circuit of the invention would be rendered conductive and so stop rotation of the switch operating member short of a full revolution. If this were allowed to occur then on a succeeding day, the device would not shut off until after the load peak had been passed. It is therefore a feature of the invention that means are provided to assure that the cycle of the switch operating member once initiated will be completed before the motor can be turned off by the photo conductive cell. In the preferred embodiment this is obtained by providing a normally open switch in series with the photo conductive cell and providing means on the rotatable switch operating member which holds the switch closed until the motor is energized by the photo cell being rendered non-conductive at nightfall. As the operating member is rotated, this means is carried away from its association with the switch which then opens so that the photo cell no longer has any control over the motor. The motor therefore can continue to operate until the switch operating member has been rotated 360° into its initial position where the normally open switch is again closed. Since it will then be daylight, the photo conductive cell is again conductive and will act to immediately stop the motor to await the coming of darkness to repeat the cycle.

The invention, although primarily useful as a device for disconnecting a load from the power lines during peak load periods, will also be useful for other purposes. For example, the invention is useful as a time switch to control street and sign lights where the schedule calls for a given length of "on" period following the onset of darkness. In the case of remote signboard lighting, service calls for resetting simple time switches after power outages is expensive. In overcoming such a need, this invention offers a great advantage. When used for the control of street and sign lighting, the present invention possesses a further advantage over more conventional photo controls in that it permits the lights to be turned off before sunrise when the light is not needed. The present invention when used as a light control also has the advantage over presently available photo controls in that once the device has started its cycle the same is not affected or changed by extraneous light.

Many other features, advantages and/or objects as well as utility, of the invention will be apperent, or will become so, from the detailed description of a preferred embodiment of the invention which will now be described.

In the drawings:

FIGURE 1 illustrates in schematic form a preferred embodiment of the invention; and FIGURE 2 illustrates a modification thereof.

Referring first to FIGURE 1, an embodiment of the invention is there illustrated as comprising a photo-controlled off-peak time switch for an electric water heater having a pair of terminals 11 and 12 by which the device is connectable to power lines supplying 240 volts of 60 cycle A.C. Terminal 12 connects by means of bus bar 13 with a terminal 14 connectable to one side of the load which, for purposes of illustration, may be considered as the heating element of a water heater. Terminal 11 is connected through suitable wiring 15 to one side of a switch indicated generally at 16 and comprising a pair of contact bearing arms 17 and 18 having make and break contacts 17a and 18a, contact arm 17 being tensioned so that the switch is normally closed. Wiring 15 connects with contact 17a of arm 17 and contact 18a of arm 18 connects via wiring 19 to terminal 20 which is connectable to the other side of the load.

A timing motor 21 is connected across 13, 15 in series with a capacitor 22 (.125 mfd.), the circuit being represented by wiring 23 which connects wiring 15 to one side of motor 21, wiring 24 connecting the other side of the motor with capacitor 22 and wiring 25 connecting the capacitor with terminal 12. Timing motor 21 is preferably a self-starting synchronous motor adapted to operate off an alternating current supply in which the frequency is regulated or maintained sufficiently constant to serve for time keeping purposes. One such motor is described in Fred Kurz' U.S. Patent No. 2,572,632, dated October 23, 1951. A photo conductive cell 26 is arranged in series with a normally open auxiliary switch 27, the photo-conductive cell and auxiliary switch being connected in parallel with motor 21 and in series with capacitor 22, the circuit therefor being illustrated in the figure as comprising wiring 28 connecting one side of the photo-conductive cell with wiring 15, the other side of the cell being connected by wiring 29 to contact bearing arm 30 of switch 27, its contact 30a, contact 31a, flexible arm 31, wiring 32, the latter connecting to wiring 24, capacitor 22, and wiring 25 to terminal 12.

The photo-conductive cell 26 may be an RCA 7163 having a cadmium sulphide plate between its two electrodes which is rendered electrically conductive in daylight so that electrical current will flow therethrough but in darkness has such a high resistance and impedance as to be considered non-conductive. Therefore, in the illustrated circuit, during daylight hours, the impedance of cell 26 being low relative to that of capacitor 22 with which it is series connected, the voltage across the motor 21 will be low and motor 21 will not operate. However, with darkness, the resistance and impedance of the cell increases to a level where it is large in relation to that of the motor so that the voltage across the motor is sufficient for it to operate.

Rotor shaft 21a of motor 21 is operatively connected through a conventional speed reducing gear train 37 to turn dial 35 on its supporting shaft 36 in a counterclockwise direction when motor 21 is energized. In the preferred form, gear train 37 is constructed to drive the dial 35 at the rate of one revolution in 20 hours. However, in accordance with the invention, gear train 37 could be arranged so that the dial is driven at a rate to make one revolution in any time period that is shorter than 24 hours but longer than the maximum period of darkness for any one day of the year.

Spaced about the periphery of dial 35 are three actuating means or tripping dogs indicated at 38, 39 and 40. Tripping dogs 39 and 40 serve to control suitable mechanisms for opening and closing switch 16. In the illustrated embodiment dog 40 actuates mechanism to open switch 16 and dog 39 actuates said mechanism to close the switch. Each of said dogs 38, 39 and 40 has a bifuracted end by means of which they may be mounted over the edge of the dial and are provided with set screws at 41 which may be tightened so as to engage in groove 34 of the dial to firmly lock respective dogs in a pre-set position along the periphery of the dial 35. By loosening set screw 41 a dog may be adjusted to any desired position along the periphery of the dial. For convenience, the dial is provided with a scale dividing its periphery into 20 hours or other number of hours required for it to make one complete revolution. When used as an off-peak utility time switch, the "off" dog 40 is set at near zero and the "on" dog 39 is angularly disposed to act approximately two and one-half hours later.

At the start of the cycle, upwardly projecting pin 42 on dog 38 is in engagement with portion 43 of a flexible spring 44, thus holding contact 31a of normally open switch 27 in engagement with contact 30a. Motor 21 will therefore not operate until at darkness photo-conductive cell 26 is rendered non-conductive. As previously indicated, tripping dogs 39 and 40 serve to actuate mechanisms which open and then reclose switch 16. As illustrated in the figure, such mechanism comprises a cam 50 mounted to turn on a shaft 49 located beneath dial 35 and essentially at the peripheral edge thereof. Cam 50 has a first surface 51 which is disposed in the path of depending pin 52 of tripping dog 40 to be engaged thereby. It also has a surface 53 to be subsequently engaged by depending pin 54 of tripping dog 39. Mounted to turn on shaft 49 is an arm 55 supporting roller 56 at its free end to engage tensioned arm 17 of main switch 16. Also mounted on shaft 49 to turn with cam 50 is a drive sector 57. Sector 57 is provided with pins 58 and 59 located to opposite sides of arm 55. In the illustrated position of arm 55, pin 59 engages arm 55 and arm 55 is held against a stop 60 by means of spring 61 having one end fastened to said stop 60 and its opposite end affixed to sector 57 by rivet 62. In this position, which is indicated by full lines, roller 56 is out of engagement with switch arm 17 so that contacts 17a and 18a complete a circuit permitting the water heater or other load to operate. However, as dial 35 is rotated in response to energizing of motor 21 with darkness pin 52 on tripping dog 40 engages surface 51 of cam 50 and causes the cam to turn about shaft 49. As cam 50 is thus turned, pin 58 on sector 57 which turns with cam 50 engages arm 55, rotating it in a counterclockwise direction about shaft 49. As the dial continues to turn, the end of spring 61 connected to the sector at 62 is carried past a line connecting the axis of shaft 49 and stop pin 60. When this occurs spring 61 acts to rapidly move lever arm 55 to a position against stop 63 which position is indicated by dotted lines. In this new position roller 56 at the end of arm 55 has caused switch arm 17 to move away from arm 18 to interrupt the circuit established through contacts 17a and 18a. Simultaneously, as spring 61 moves arm 55 to this new position, cam 50 is also rotated to a new position indicated in dotted lines which allows pin 52 of dog 40 to slide past surface 51 of the cam as dial 35 continues to turn. In this new position of cam 50, its surface 53 is presented into the path of pin 54 carried by tripping dog 39 wherefor as dial 35 continues to rotate, pin 54 engages surface 53 so as to trip the cam 50 in an opposite or clockwise direction causing sector 57 by means of its pin 59 to return lever arm 55 to the position shown in full lines. Spring 61 again acts as its riveted connection rivet 62 on sector 57 passes said center line connecting the axes of shaft 49 and stop pin 60 so that the pressure of roller 56 on switch arm 17 is thereafter rapidly removed and the switch closes with a snap action.

As previously mentioned, switch dial 35 is arranged to be driven by motor 21 at the rate of one revolution in 20 hours. The four hours left of a full days provides a tolerance for power outages. No manually resetting of the dial is necessary since if a power outage occurs, this merely shortens the "wait" period between the time the dial stops at the end of its revolution and the time when darkness reoccurs. If the power outage in any one day exceeds four hours, this means only that more than one day will be required for the switch operation to get back in phase with the load peak period of the system.

The operation of the control switch is as follows: Upon completion of a full revolution of dial 35, switch 27 is closed by reason of pin 42 on tripping dog 38 engaging portion 43 of spring 44. This act connects photo-conductive cell 26 in parallel with the winding of motor 21. In normal operation, this occurs when the cell is subject to daylight and therefore conducting. Uunder this condition, the impedance of the photo-conductive cell being low relative to that of the capacitor 22 with which it is in series, the voltage across the cell and the motor 21 will be lowered and motor will stop. The motor will remain stopped and the dial will not rotate until darkness reoccurs. With darkness the resistance and impedance of the photo-conductive cell 26 will increase to where it is large relative to that of the motor and, under this circumstance, the voltage across the motor will rise to where the motor will start and so turn the dial 35. A short time after the dial 35 starts to turn (approximately 5 minutes) pin 42 on tripping dog 38 will pass beyond portion 43 of spring 44 whereupon auxiliary switch 27 will open, disconnecting the photo cell from the timing motor circuit. Tripping dog 40 is preferably so angularly displaced from tripping dog 38 that its pin 52 will engage surface 51 of cam 50 to open the main switch only after auxiliary switch 27 has been opened. This assures that the switching cycle will be completed regardless of any change in light condition once the load is disconnected by opening switch 16, wherefore the "off" period of the water heater or other load will not exceed the preselected length, which in the example taken for illustration, is two and one-half hours.

The switch 16 will then remain open and the load disconnected until pin 54 on tripping dog 39 engages surface 53 of cam 50. The motor, however, continues to run and to drive dial 35 until it has made a complete revolution and tripping dog 38 has been returned to its starting position where pin 42 engages spring portion 43 to close the auxiliary switch 27. If the photo-conductive cell is lighted, the motor is stopped to wait for darkness to repeat the cycle.

As previously mentioned, the rate at which dial 35 is driven by motor 21 is selected to be less than 24 hours but greater than the longest period of darkness for any day of the year. Twenty hours has been selected as the preferred rate to make one complete revolution of the dial, since this provides approximately two hours over the maximum period of darkness which occurs between sunset and sunrise between latitdues 60° N. and 60° S. This two hours provides an adequate safety factor for cloudy conditions which may occur either at the end or at the beginning of the cycle. For example, if it were cloudy, as night approached cell 26 would be rendered non-conductive earlier. This would be consistent with an earlier load peak on the power companies' supply lines. However, if gear train 37 were adjusted so that motor 21 would turn dial 35 through a complete revolution equal to the predicated period between sunset and sunrise for that day, then because of the earlier darkness brought on by clouds the dial 35 could complete its revolution before daylight and under which circumstances cell 26 would still be non-conductive. Consequently on the closing of switch 27 the motor would continue to run and the dial would be started on a second revolution and would move it out of phase with the "load peak" period of the succeeding day. By selecting a longer period than the maximum darkness period of 18 hours, there is greater assurance that the cycle of the time switch will remain properly synchronized with the daily peak load periods.

It will be recognized, however, that in selecting a period to complete a revolution of dial 35 which is longer than the maximum darkness period of any one day, although the dial will commence to turn at darkness, daylight will usually occur before the dial has completed a full revolution which means that cell 26 will be conductive and therefore in a condition to stop the motor before the dial completes a full revolution. Obviously if this were allowed to occur, the time switch would be constantly out of phase with the "load peaks." However, since switch 27 is opened almost immediately after the start of rotation of the dial 35 and remains open until a complete revolution of the dial has occurred, lighting of cell 26 to render it conductive will have no effect on motor 21 until switch 27 is again closed at the end of the cycle, when the dial 35 has completed its full revolution.

In the usual operation of the invention, as a photo-controlled off-peak utility time switch, tripping dogs 39 and 40 will be so set that switch 16 is opened immediately after darkness, that is immediately after dial 35 starts to rotate and recloses the switch approximately two and one-half hours later. However, the time interval for which switch 16 is open can be set for any desired period by an appropriate spacing of tripping dogs 39 and 40.

As previously mentioned, the invention may be also utilized as a switch for turning on street lights or sign lights. In this event, arms 17 and 18 of the switch 16 may be reversed so that tripping dog 40 acts to close the switch and dog 39 to open it. Or the sequence of the tripping dogs 39 and 40 on dial 35 also could be reversed so that pin 54 of dog 39 would be caused to first engage surface 53 of cam 50 to effect closing of the switch and with further rotation of the dial, dog 40 would be rotated into position where its pin 52 would engage surface 51 of the cam 50 to open switch 16.

If used to control street lighting, the angular displacement of dogs 39 and 40 presumably would be greater than the mentioned two and one-half hours.

Although the above described embodiment is a preferred form of the invention, it will be understood that many variations and modifications of, as well as rearrangement of the parts, may be devised within the spirit of the invention and are intended to be included within the scope of the claims hereinafter appended, which claims are to be interpreted as broadly as is permitted by the prior art. For example, in FIGURE 2 a photo-conductive cell such as indicated at 126 is illustrated arranged in a circuit leading from terminal 11, line 124, relay 120, line 129, cell 126 and line 128 to ground 130 to energize relay 120 when it is rendered conductive by daylight. Relay 120, when thus sensitized, holds open normally closed switch 122, lead 125 leading to one side of the motor circuit, the other side of the motor being connected by line 131 to line 15 and terminal 11. With darkness cell 126 becoming non-conductive allows switch 122 to close and thus to energize the timing motor 21 so as to turn dial 35. Timing motor 21 controls load switch 16 through dial 35 as in the described embodiment of FIGURE 1. However normally closed switch 127 is series connected via lines 132 and 133 with the timing motor 21 and parallel connected with respect to the mentioned relay operated normally closed switch. This further switch 122 would also be normally closed but held open by pin 42 of dog 38 bearing on portion 43 of spring 44. Upon energizing of the timing motor 21 and turning of dial 35 in response thereto, switch 127 closes as pin 42 of dog 38 moves out of engagement with spring portion 43 to provide an alternate current path which keeps the timing motor running after the first switch 122 is opened by the photo-conductive cell being rendered conductive with daylight and resensitizing relay 120 in its circuit. Upon completion of a full revolution by the dial 35, switch 127 is also reopened so that the motor stops as in the preferred embodiment, and awaits darkness to repeat the cycle.

From the above description of the preferred and an alternate embodiment of the invention, it will be seen that all of the objects, advantages and features of the invention are obtainable in a convenient, simple and highly practical manner.

Thus having described our invention, we claim:

1. In combination, switch means adapted for connection into a load circuit, a switch operating member adapted to be repetitively moved through a given cycle, said member having means to first open and then close said switch means as the member is moved through said cycle, control means having light sensing means associated therewith to initiate said cycle of movement of the member when the intensity of light is to one side of a selected threshold and to inhibit movement thereof when the intensity of light is to the other side of said threshold, and means actuated by the said switch operating member as it is moved through said cycle which disassociate said light sensing means and control means until the switch operating member has completed its cycle.

2. In combination, switch means adapted for connection into a load circuit, a switch operating member including a rotatable disc having means associated therewith to first open and then to close said switch means as the disc is turned through a fraction of one revolution, control means including light sensing means to initiate said rotation of the disc member when the intensity of light on the light sensing means to one side of a selected threshold and to inhibit movement thereof when the intensity of light on said light sensing means is to the other side of said threshold, and means actuated by rotation of the disc which disassociate said control means and light sensing means until said disc of the switch operating member has completed a full revolution.

3. In combination, a first switch adapted for connection into a load circuit, switch actuating means in association therewith, a rotatable member, an energizable motor drivingly connected to said rotatable member to turn the same, means carried by said rotatable member to first open and then to close the first switch as it is rotated through a fraction of a full turn, light sensing means, control means associated therewith which energize said motor when said light sensing means is in a deactivated state and de-energize the motor when the light sensing means is in an activated state, and further means actuated by the initial turning of the rotating member which disassociate said light sensing means from said control means to prevent deenergizing of the motor by activation of the light sensing means until after the rotating member once started has completed a full turn.

4. In combination, switch means adapted for connection into a load circuit, a movable switch operating member having means to first open and then to close said switch means as the member is moved through a given cycle, a motor for moving said switch operating means through its cycle, a photoconductive cell rendered conductive by daylight and non-conductive by darkness, and control means associated with said cell to operate the motor, the association of said light sensing means with the control means inhibiting operation of the motor when the cell is conductive and permitting operation of the motor when the cell is non-conductive, and additional means actuated by said switch operating member to disassociate said control means and light sensing means whereby to allow said switch operating member to complete its cycle once its movement has been initiated.

5. In combination switch means adapted for connection into a load circuit, a switch operating member adapted to be repetitively moved through a given cycle, said member having means to effect opening and closing of said switch means as the member is moved through and given cycle, an electrically energized motor for moving said switch operating means through its cycle, a photoconductive cell rendered conductive by daylight and non-conductive by darkness, said cell being connected in parallel with said motor, and control means in series with said cell and the motor which inhibits operation of the motor when the cell is conductive and permits operation of the motor when the cell is non-conductive, and additional means which are actuated by operation of said switch operating member to alter the series connection of the cell with the control means whereby the switch operating member will complete its cycle once its movement therethrough has been initiated.

6. In an off-peak utility switch, a first switch adapted for connection into a load circuit, a rotatable switch operating member, an energizable motor drivingly connected to said switch operating member to turn the same at a rate to make one complete turn in less than 24 hours but in more hours than equals the maximum darkness period of any one day of the year, means carried by said rotatable member to first open and then to close the first switch as the member is rotated, means including a photoconductive cell for energizing said motor to initiate turning of the switch operating member when said cell is rendered non-conductive with the coming of darkness and to de-enerfize the motor when it is rendered conductive, and further means actuated by the initial turning of the switch operating member which prevent the cell from deenergizing the motor once it has started until after the switch operating member has completed a full turn.

7. In an off-peak utility switch, a first switch adapted for connection into a load circuit, a rotatable switch operating member, an energizable motor drivingly connected to said switch operating member to turn the same at a rate to make one complete turn in less than 24 hours but in more hours than equals the maximum darkness period of any one day of the year, means carried by said rotatable member to first open and then to close the first switch as the member is rotated through a fraction of a complete turn, a photoconductive cell connected in parallel with said motor, and capacitor means series connected with said cell and motor which permit operation of the motor to initiate turning of the switch operating member when said cell is non-conductive and which inhibits said operation when the cell is conductive, and further means actuated by the initial turning of the switch operating member which opens the photo-conductive cell circuit to prevent deenergizing of the motor by reactivation of the photocell until after the switch operating member once started has completed a full turn.

8. In an off-peak utility switch, a first switch adapted for connection into a load circuit, a rotatable switch operating member, an energizable motor drivingly connected to said switch operating member to turn the same at a rate to make one complete turn in less than 24 hours but in more hours than equal the maximum darkness period of any one day of the year, spaced means carried by said rotatable member to first open and then to close the first switch as it is rotated through a portion of its full turn, a photoconductive cell, and means under the control of said cell to effect energizing of said motor when said cell is non-conductive and to de-energize the motor when the cell is conductive, and further means actuated by the initial turning of the switch operating member to prevent de-energizing of the motor by the cell when it is rendered conductive until after the switch operating member once started has completed a full turn.

9. In a time switch, the combination of a first switch member adapted for connection into a load circuit, a rotatable disc, a timing motor geared to turn said disc, said motor being connected across said load circuit and in series with a capacitor of a selected impedance, a series arranged photo conductive cell and normally open switch connected across said load circuit in parallel with said motor and series connected with said capacitor, the electrical characteristics of the cell in relation to the impedance of the capacitor being such that when the switch is closed and the cell is conductive there is insufficient voltage across the motor for it to operate and when the cell is non-conductive, the voltage across the motor is sufficient for the motor to operate, said first switch member including a tensioned arm actuatable to make and break the load circuit into which the switch member is connected, a pivotally connected lever having one end engaging said tensioned arm and a cam mounted adjacent said disc and operably actuating with said lever to move said lever between a first position in engagement with the tensioned arm where said arm is caused to make the circuit and a second position where its engagement with the arm causes said arm to break the circuit, a first, second and third actuating means on the rotatable disc, the first actuating means being disposed to engage the normally open switch at one position in the rotation of the disc so as to hold the switch closed, the second actuating means being located on the disc so as to be brought into actuating relation with the cam as the disc is rotated to cause the cam to shift said lever to one of its two positions in engagement with the tensioned arm of the switch member, the third actuating means being located on the disc to follow the second actuating means in rotation of the disc so as to be brought into actuating relation with the cam to cause the cam to return the lever to the other of its positions of engagement with the tensioned arm, and the first actuating means being moved out of engagement with the normally open switch as it is moved from its position by the turning of the disc to allow the switch to open whereby subsequent rendering conductive of the photoconductive cell will not stop operation of the motor until the disc has completed a full revolution and the first actuating means is again returned to its said position in engagement with the normally open switch to hold it closed.

10. In an off-peak utility time switch, the combination of a switch member adapted for connection into a load circuit, a rotatable disc, a first control circuit including a timing motor geared to turn said disc one revolution in about twenty hours, a second control circuit including a photoconductive cell and means under the control of said cell to effect energizing of the motor when the cell is non-conductive and to de-energize the motor when the cell is conductive, one of said control circuits including switch means actuable to render the cell ineffective to de-energize the motor, said first switch member including a tensioned arm actuable to open and close the circuit into which the switch member is connected, a pivotally connected lever having one end engaging said tensioned arm and a cam mounted adjacent said disc and operable so as to rotate said lever into a first position where its engagement with the arm will cause it to open the circuit and into a second position where its engagement with the arm will cause the arm to close the circuit, a first, second and third actuating means on the rotatable disc, the first actuating means being located in the disc to actuate said switch means after the initial energizing of the motor so that subsequent rendering conductive of the photoconductive cell will not stop operation of the motor until the disc has completed a full revolution and the first actuating means has been returned to its starting point where it deactuates the switch means, the second actuating means being positioned on the disc where it will operate the cam after the disc has turned through a given angle causing the cam to shift said lever from its second to its first position, and the third actuating means being on the disc to follow the second actuating means as the disc is turned and so as to subsequently operate the cam causing the cam to shift the lever arm back to its second position, and the spacing of said second and third actuating means on said disc being adjustable to permit setting the time interval and length thereof at which the load circuit will be opened by the time switch into which it is connected.

References Cited by the Examiner

UNITED STATES PATENTS

| 2,446,450 | 8/1948 | Ziegler | 250—215 X |
| 3,023,282 | 2/1962 | Blakeslee et al. | 200—38 |
| 3,028,458 | 4/1962 | Strathearn et al. | 200—38 |
| 3,033,969 | 5/1962 | Benway et al. | 219—20 |

RALPH G. NILSON, *Primary Examiner.*

WALTER STOLWEIN, *Examiner.*